(12) United States Patent
Sibert et al.

(10) Patent No.: US 8,812,840 B2
(45) Date of Patent: Aug. 19, 2014

(54) METHOD FOR FAST PRE-AUTHENTICATION BY DISTANCE RECOGNITION

(75) Inventors: Herve Sibert, Le Mans (FR); Marc Girault, Caen (FR)

(73) Assignee: France Telecom, Paris (FR)

( * ) Notice: Subject to any disclaimer, the term of this patent is extended or adjusted under 35 U.S.C. 154(b) by 1872 days.

(21) Appl. No.: 11/883,975

(22) PCT Filed: Feb. 1, 2006

(86) PCT No.: PCT/FR2006/000221
§ 371 (c)(1),
(2), (4) Date: Jul. 11, 2008

(87) PCT Pub. No.: WO2006/082310
PCT Pub. Date: Aug. 10, 2006

(65) Prior Publication Data
US 2009/0138707 A1    May 28, 2009

(30) Foreign Application Priority Data
Feb. 7, 2005 (FR) ...................... 05 01214

(51) Int. Cl.
*H04L 29/00* (2006.01)
(52) U.S. Cl.
USPC ...................... 713/168; 726/2; 726/9; 726/21
(58) Field of Classification Search
USPC ........ 713/168, 172; 726/2, 9, 21; 71/168, 172
See application file for complete search history.

(56) References Cited

U.S. PATENT DOCUMENTS

| | | | |
|---|---|---|---|
| 6,772,331 B1 * | 8/2004 | Hind et al. | 713/151 |
| 7,031,470 B1 * | 4/2006 | Bar-On | 380/203 |
| 7,194,765 B2 * | 3/2007 | Blom | 726/12 |
| 7,370,350 B1 * | 5/2008 | Salowey | 726/7 |
| 2003/0065918 A1 * | 4/2003 | Willey | 713/168 |
| 2004/0066278 A1 | 4/2004 | Hughes et al. | |
| 2005/0061875 A1 * | 3/2005 | Zai et al. | 235/383 |
| 2008/0044027 A1 * | 2/2008 | Van Dijk | 380/278 |

FOREIGN PATENT DOCUMENTS

| | | | |
|---|---|---|---|
| EP | 0 831 616 A | | 3/1998 |
| EP | 1 255 372 A | | 11/2002 |

(Continued)

OTHER PUBLICATIONS

English Translation of an Office Action issued on Apr. 10, 2012 in the corresponding Japanese Application No. 2007-553648.

*Primary Examiner* — Brandon Hoffman
*Assistant Examiner* — Michael D Anderson
(74) *Attorney, Agent, or Firm* — Cozen O'Connor

(57) ABSTRACT

A method of pre-authentication of a first entity (10) by a second entity (1) communicating with each other via a wireless connection. The second entity (1) sends (23') a challenge value (c). If the first entity (10) receives (23) a challenge value (c'), it applies to the received challenge value a predefined transformation (g) known to the second entity to obtain a first transformed value (r) and then sends (24) the first transformed value (r) obtained. If the second entity receives (24') a transformed value (r'), it compares (25') the received transformed value to a second transformed value (r") obtained by applying the predefined transformation (g) to the challenge value sent and considers the pre-authentication to have succeeded if the result of comparing the second transformed value obtained and the transformed value received is below a predefined threshold (m).

13 Claims, 1 Drawing Sheet

(56) References Cited

FOREIGN PATENT DOCUMENTS

| | | |
|---|---|---|
| JP | 05336108 A | 12/1993 |
| JP | 2001034797 A | 2/2001 |
| JP | 2001331105 A | 11/2001 |
| JP | 2003-224677 | 8/2003 |
| JP | 2004-507714 | 3/2004 |
| JP | 2004-229140 | 8/2004 |
| WO | WO 01/94974 | 12/2011 |

* cited by examiner

METHOD FOR FAST PRE-AUTHENTICATION BY DISTANCE RECOGNITION

RELATED APPLICATIONS

This is a U.S. National Stage of International Application No. PCT/FR2006/000221 filed on Feb. 1, 2006.

FIELD OF THE INVENTION

The present invention relates to the field of cryptography and contactless (NFC: near field communication) cards or RFID (radio frequency identification) chips. In particular, the invention relates to a method of authentication before continuing a communication.

It applies in particular, although not exclusively, to protecting confidential information stored in an RFID chip that is low-cost and in particular disposable. Such chips are used as passenger transport tickets, for example. In that application, the RFID chip broadcasts its identifier if a reader requests it to do so when the chip is at a very short distance (of the order of one centimeter) from the reader. To read the rights of the cardholder, the reader consults a database associating identifiers and respective rights.

BACKGROUND OF THE INVENTION

In the field of microchip cards that function by contact, the problem of knowing whether the card should or should not respond to such a request does not arise. An authentication protocol is indeed initiated when a smart card is inserted into a smart card reader. The insertion of the smart card into the reader by the cardholder constitutes de facto authorization for the reader to perform the authentication.

In contrast, a contactless chip cannot tell a priori what entity is requesting it to provide information. It therefore responds to any request for information by giving its identifier, without taking any precautions. Thus by using a sufficiently powerful transmitter it is possible to send such requests to any contactless chip within range of the transmitter. The chip processes the enquiry, but the response does not reach the receiver. This mode of operation is incompatible with issues of security and data protection, and it would seem desirable to integrate cryptographic functions into such chips.

At present a contactless chip equipped with a security function systematically accepts initiation of a cryptographic protocol on receiving an external request. That kind of operation has many drawbacks. If the chip employs secret key cryptography for authentication, the number of readers that can authenticate it must be very small, to prevent excessive dispersion of the secret key of the chip. If many readers hold that key, the problem of the number of keys that readers must know arises, as well as a security problem, since security is then based entirely on the inviolability of the chips and the readers.

RFID chips have cryptographic resources that are necessarily limited and, in some cases, non-reusable.

With public key cryptography, the least costly protocols require data that is used only once to be prestored in the chip. It is therefore possible to flood an RFID chip with requests, the effect of which is to exhaust this data or even to render the chip mute.

SUMMARY OF THE INVENTION

An object of the present invention is to eliminate those drawbacks by allowing a chip to verify the legitimacy of an authentication request received from a reader without authenticating the reader, taking the proximity of the reader as sufficient indication of its legitimacy to request the chip to authenticate itself. To this end, the chip verifies that the reader is in its transmission field, which is very small by virtue of how the chip is constructed.

The above objective is achieved by providing a method of pre-authentication of a first entity by a second entity communicating with each other via a wireless connection. According to one aspect of the invention the method includes steps during which:

the second entity sends a challenge value;

if the first entity receives a challenge value, it applies to the received challenge value a predefined transformation known to the second entity to obtain a first transformed value and then sends the first transformed value obtained; and if the second entity receives a transformed value, it compares the received transformed value to a second transformed value obtained by applying the predefined transformation to the challenge value sent and considers the pre-authentication to have succeeded if the result of comparing the second transformed value obtained and the transformed value received is below a predefined threshold.

In one embodiment of the invention the second transformed value obtained and the transformed value received are sequences of bits, the comparison effected by the second entity being a bit by bit comparison based on the number of bits of the second transformed value that differ from those of the received transformed value, the threshold value being defined as a function of the number of bits that are different.

In one embodiment of the invention there is a very high probability that the challenge value sent is different from a challenge value sent during a preceding authentication and not deducible therefrom.

In one embodiment of the invention the challenge value sent by the second entity is obtained by applying a pseudorandom function to data contained in the second entity.

In one embodiment of the invention the method is executed periodically during a transaction between the first entity and the second entity.

In one embodiment of the invention the predefined transformation supplies a transformed value identical to the challenge value to which the transformation is applied.

In one embodiment of the invention the predefined transformation is a function depending in the same way on secret information common to the two entities.

According to another aspect of the invention, a data processing module including means for communicating via a wireless connection with an entity. The data processing module includes means for:

sending a challenge value;

computing a transformed value by applying a predefined transformation known to the entity to the sent challenge value;

receiving a transformed value after sending the challenge value;

comparing the received transformed value to the computed transformed value; and considering the entity pre-authenticated if the result of the comparison between the computed transformed value and the received transformed value is below a predefined threshold.

Another aspect of the invention is directed to reader including means for communicating via a wireless connection with a data processing module, comprising means for:

receiving a challenge value;

applying a predefined transformation known to the processing module to the received challenge value to obtain a transformed value; and sending the transformed value obtained to be authenticated by the data processing module.

Another aspect of the invention involves a computer program for pre-authenticating a first entity to a second entity communicating with the first entity via a wireless connection, including instructions for commanding execution of the following steps if it is executed by a data processing system associated with the first entity:

receiving a challenge value;

applying a predefined transformation known to the processing module to the received challenge value to obtain a transformed value; and sending the transformed value obtained to be authenticated by the second entity.

Another aspect of the invention involves a computer program for pre-authenticating a first entity to a second entity communicating with the first entity via a wireless connection, including instructions for commanding execution of the following steps if it is executed by a data processing system associated with the second entity:

sending a challenge value;

computing a transformed value by applying a predefined transformation known to the first entity to the sent challenge value;

receiving a transformed value after sending the challenge value;

comparing the received transformed value to the computed transformed value; and considering the entity pre-authenticated if the result of the comparison between the computed transformed value and the received transformed value is below a predefined threshold.

Another aspect of the invention is directed to a system for pre-authentication of a first entity by a second entity connected to each other by a wireless connection. According to the invention the second entity includes means for:

sending a challenge value to the first entity;

computing a first transformed value by applying a predefined transformation known to the first entity to the sent challenge value;

receiving a transformed value after sending the challenge value;

comparing the received transformed value to the computed first transformed value; and considering the first entity pre-authenticated if the result of comparing the computed first transformed value and the received transformed value is below a predefined threshold;

the first entity including means for:

receiving the challenge value sent by the second entity;

applying the predefined transformation to the received challenge value to obtain a second transformed value; and sending the second transformed value obtained to be authenticated by the second entity.

DETAILED DESCRIPTION OF THE DRAWINGS

Figure 1:
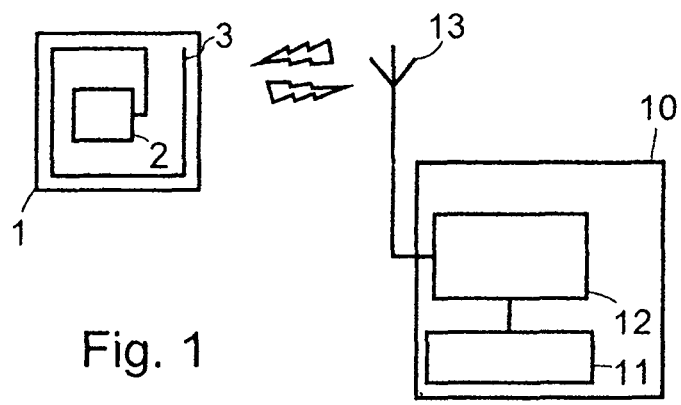
FIG. 1 represents diagrammatically a contactless chip or an RFID chip communicating with a reader.

FIG. 1 represents a contactless or RFID chip 1 in the vicinity of a reader 10 of such chips. The chip 1 includes very limited computation means 2 connected to a short-range antenna 3. The reader 10 includes a computer 11 connected to transceiver means 12 connected to an antenna 13.

The invention is based on the asymmetry of the sending means of the contactless or RFID chip 1, which have a low power, and those of the reader 10, which are comparatively unlimited. If the chip 1 wishes to send a packet of data to the reader 10, it suffices for it to broadcast the packet using its sending means, whose coverage includes the location of the reader. If the sending means of the chip are too weak, given the distance between the chip and the reader, the packet disappears in the ambient noise at the location of the reader, which does not receive the packet. The chip transmits only if a reader requests it to identify itself. Such a request is legitimate if the chip is at a very short distance (less than a few centimeters) from the reader, as with a passenger transport ticket, for example.

Figure 2:
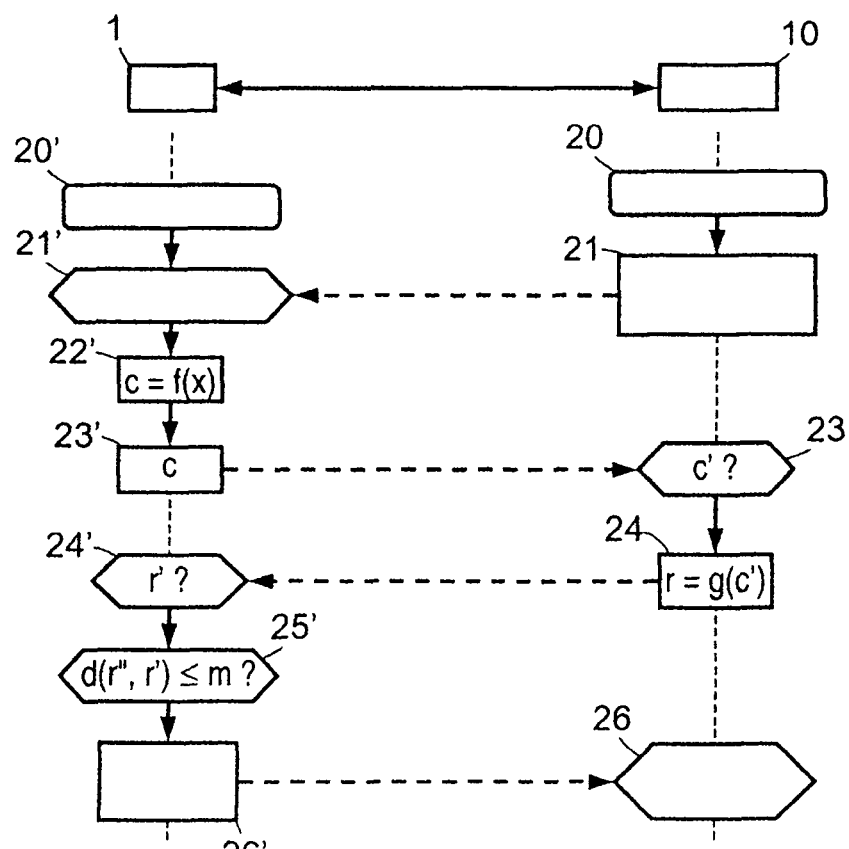
FIG. 2 is a flowchart that illustrates the various steps of the method of the invention implemented in the chip and in the reader represented in FIG. 1.

In the method illustrated in FIG. 2, the reader 10 executes an authentication procedure 20 during which it periodically transmits an authentication request (step 21). If a chip is within range of the reader, it detects the signal transmitting the request, which initiates execution by the chip of an authentication procedure 20'.

In the first step of that procedure, the chip receives the authentication request (step 21'). After receiving the request, the chip 1 uses a function $f$ integrated into the chip to compute a sequence of bits $\underline{c}$ constituting a challenge (step 22') and sends the sequence $\underline{c}$ obtained to the reader 10 (step 23'). If the card is no longer in the field of the reader, the reader does not receive the sequence $\underline{c}$ and the procedure terminates. In contrast, if the reader receives a challenge sequence c' (step 23), corresponding to the sequence $\underline{c}$, possibly degraded by its transmission, it then computes a response $\underline{r}$ by applying to the received sequence c' a function $\underline{g}$ implemented in the reader and also in the chip, and transmits that response $\underline{r}$ (step 24). The response $\underline{r}$ also takes the form of a sequence of bits depending on the challenge sequence c'. If the chip receives a response r', possibly degraded by its transmission (step 24'), it compares that response to a theoretical response r" that it computes in the step 25' by applying the function $\underline{g}$ to the sequence $\underline{c}$: r"=g(c). To alleviate any errors occurring during transmission (interference, etc.), this comparison need not seek strict equality.

Of course, the response r" (step 25') can be computed at some other time, for example before receiving the response r'.

If there is no difference between r" and r' (if there is perfect equality) or there is a difference below a predefined threshold value $\underline{m}$, then the result of verifying the proximity of the reader 10 is positive. Otherwise, the result of verifying the proximity of the reader is negative, including in the event the chip not receiving a response. If the result of the proximity verification is positive, the authentication procedure continues in a standard manner in the step 26' during which the chip sends its identifier, which the reader 10 receives in the step 26.

Thus the invention replaces the visual check that the user of a contactless smart card can effect when inserting a card into a reader.

To enable stronger authentication, the function g (which in general need not be kept secret) can be kept secret and vary according to the entities (chips and readers) involved. For example, the function g can be an encryption function parametered by secret key. The general function g is then known, but the keys differ according to the groups of entities: only entities knowing the same key can communicate with each other.

The procedure for detecting the proximity of the reader can be integrated into chips of very low cost, such as RFID chips, and can be effected one or more times during a transaction between the reader 10 and the chip 1, i.e. during a sequence of exchanges between the reader and the chip.

The difference between the two bit sequences r' and r" is advantageously represented by a distance d calculated using the Hamming weighting function, for example, and defined as follows:

$$d(r',r'')=w(r'\oplus r'') \quad (1)$$

where ⊕ designates the "exclusive OR" operation effected bit by bit and w designates the Hamming weight (the number of non-zero bits of a bit sequence).

In other words, d(r', r") is the number of non-zero bits of the bit by bit sum of r' and r" or the number of positions in which the bits of r' and r" are different. Using this kind of function is a simple way to limit the effects of minor transmission errors.

To allow for loss of synchronization between the challenge and the response, the distance between r" and modifications of r' resulting from loss of synchronization can also be measured and the final distance chosen as the minimum of all the distances computed.

In a first embodiment, the function f is a constant function and therefore does not call for any particular implementation: the challenge sequence c is a constant bit sequence, for example a sequence of 64 bits, stored in the chip 1. The function g is preferably the identity function, but any other function that is simple for the chip to compute is equally suitable. The chip verifies the proximity of the reader once, or preferably periodically, to make an active attack after authentication more difficult. The sequence r=g(c') is preferably sent by the reader 10 in the step 24 at a reduced power in order to reduce the probability of c' being intercepted and to make an active attack after execution of the protocol more difficult.

In the step 25', equality between the received sequence r' and the value r" computed locally by the chip applying the function g to a challenge value c is tested by verifying that d(r", r')≤m, where m is a constant (for example m=4).

For the values given by way of example, the security level obtained by this embodiment is better than $2^{43}$. In other words, for these values, a reader that has never communicated with the chip 1 and is outside its range has less than one chance in $2^{43}$ of sending a random value that will be accepted by the chip as a response to its challenge. Where transmission errors are not to be feared (for example if transmission is protected by an error corrector code), one option that can be chosen is m=0, which means that the chip 1 accedes to the identification request sent by the reader 10 if and only if r'=g(c).

In a second embodiment, the function g is identical to that chosen in the first embodiment, but on each challenge the chip sends a different sequence c that is to some extent unpredictable, so that the reader cannot anticipate the value of c. In particular, each sequence c used cannot be deduced mathematically from sequences sent previously, or at least those sent in the recent past. Various ways to achieve this are known in the art. For example, when the chip is customized, a list of values chosen at random is entered into the data memory of the chip and the chip works through this list sequentially to choose the values of c used in its challenges. When it has worked through the whole of the list, the chip locks up or resumes the list from the beginning, or a procedure for loading new values is executed.

Another way to calculate new values of c is to use a pseudo-random function f applied to certain data contained in the chip. For example, that data can come from a counter incremented each time that the function f is called or from a memory storing a "current state" of the function, or more generally from all or part of the state of the memory of the chip at the time of the calculation, where applicable including data supplied by the reader before authentication. For example, the function f can be a linear feedback shift register or registers combined by a non-linear Boolean function, in which case the "current state" is that of the registers. The function f has an output of fixed length, for example 64 bits.

In order to limit the operations that the chip has to perform, the function g is preferably the identity function. In this embodiment, there is lengthy communication between the chip 1 and the reader 10, and it is advisable to execute the proximity verification (steps 21' to 25' and 21 to 24) repeatedly. Authentication is effected by the chip once or periodically. The threshold value m is made equal to 8, for example.

To make a challenge more secure, the current state can be updated, given the disclosure of the preceding values of c (for example, in a linear feedback shift register, by continuously computing the later states of the register between two challenges, for as long as the chip is powered). The security level obtained on each execution in this embodiment, using the values given by way of example, is better than $2^{31}$. Since the function f is assumed to be a good pseudo-random generator, a reader that knows the chip 1 cannot anticipate the value of c. For the values given by way of example, any reader that is out of range of the chip therefore has less than one chance in $2^{31}$ of sending a random value c that the chip will accept as a response to its challenge.

In a third embodiment, the function f is the same as in the second embodiment. In contrast, the function g takes for its parameter a secret argument, for example on 64 bits. This function can be a symmetrical encryption function based on linear feedback shift registers, with initialization based on a sequence of 64 bits and a key common to the chip 1 and the reader 10 with which it is intended to communicate. In this embodiment, communication between the chip and the reader is lengthy and sensitive. As before, authentication is effected by the chip once or periodically. The threshold value m is equal to 8, for example.

The level of security obtained in this embodiment using the values given by way of example is better than $2^{43}$. Since f is assumed to be a good pseudo-random generator, a reader that knows the chip 1 cannot anticipate the challenge value c. Assuming furthermore that the function g is secure, for the values given by way of example, any reader that is out of range of the chip therefore has less than one chance is $2^{43}$ of sending a random value that will be accepted by the chip as a response to its challenge. This embodiment continuously tests both the proximity and the authenticity of the reader in terms of having the right to authenticate the chip.

The invention claimed is:

1. A method of authentication in which there is pre-authentication of a first device (10) by a second device (1) to determine whether the authentication of the second device by the first device is to be completed, the first device and the second device communicating with each other via a wireless connection, the method comprising the steps of:

receiving by the second device an authentication request from the first device entity;

verifying by the second device, in response to the authentication request, whether the first device is in a transmission field of the second device, wherein the verifying step comprises:

sending, by the second device (1), a first challenge value (c);

receiving (23), by the first device (10), a second challenge value (c') corresponding to the first challenge value (c) sent by the second device (1);

applying, by the first device (10), to the received second challenge value (c') a non-secret predefined transformation (g) to obtain a first transformed value (r) and then sending (24) the first transformed value (r) obtained;

receiving (24'), by the second device, a third transformed value (r') corresponding to the first transformed value (r) sent by the first device;

comparing (25'), by the second device, the received third transformed value (r') to a second transformed value (r") obtained by applying the predefined transformation (g) to the first challenge value (c) sent by the second device and considering the verifying to have succeeded only if the difference between the second transformed value (r") obtained and the received third transformed value (r') is below a predefined threshold (m); and the second device (1) proceeds with authentication in response to the authentication request from the first device (10) only if the verifying by the second device has succeeded.

2. The method according to claim 1, wherein the second transformed value (r") obtained and the received third transformed value (r') are sequences of bits, the comparison effected by the second device (1) being a bit by bit comparison based on the number of bits of the second transformed value that differ from those of the received third transformed value, the threshold value (m) being defined as a function of the number of bits that are different.

3. The method according to claim 1, wherein there is a very high probability that the first challenge value (c) sent is different from a previous challenge value sent during a preceding authentication and not deducible therefrom.

4. The method according to claim 1, wherein the first challenge value (c) sent by the second device (1) is obtained by applying a pseudo-random function to data contained in the second device (1).

5. The method according to claim 1, wherein the method is executed periodically during a transaction between the first device (10) and the second device (1).

6. The method according to claim 1, wherein the predefined transformation (g) supplies a transformed value identical to the first challenge value (c) to which the transformation is applied.

7. The method according to claim 1, wherein the predefined transformation (g) is a function depending in the same way on secret information common to the two entities (1, 10).

8. A data processing module (1) configured to communicate via a wireless connection with an device (10) to determine whether an authentication of the data processing module by the device (10) is to be completed, the data processing module (1) comprising means for:

receiving an authentication request from the device (10);

verifying, in response to the authentication request, whether the device (10) is in a transmission field of the data processing module (1), wherein the verifying comprises:

sending a challenge value (c);

computing a first transformed value (r") by applying a non-secret predefined transformation (g) to the sent challenge value (c);

receiving a second transformed value (r') after sending the challenge value (c);

comparing the received second transformed value (r') to the computed first transformed value (r"); and considering the verifying to have succeeded only if the difference between the computed first transformed value (r") and the received second transformed value (r') is below a predefined threshold (m), wherein the data processing module (1) proceeds with authentication in response to the authentication request from the device (10) only if the verifying by the second device has succeeded.

9. A reader (10) configured to communicate via a wireless connection with a data processing module (1) to determine whether an authentication of the data processing module by the reader (10) is to be completed, the reader (10) comprising means for:

sending an authentication request to the data processing module (1);

receiving a challenge value (c') from the data processing module (1) after sending the authentication request;

applying a non-secret predefined transformation (g) to the received challenge value to obtain a transformed value (r);

sending the obtained transformed value (r) to the data processing module; and receiving, after sending the obtained transformed value (r), an identifier from the data processing module (1) in response to the sent authentication request, the identifier being received after the data processing module (1) has performed a verification based on the obtained transformed value (r) to determine whether the reader (10) is in a transmission field of the data processing module (1).

10. A computer program, stored on a computer memory and executing on a processor of a data processing system associated with a first device (10), for performing authentication in which there is pre-authentication of the first device (10) by a second device (1) communicating with the first device (10) via a wireless connection to determine whether an authentication of the second device (1) by the first device (10) is to be completed, the computer program comprising instructions for commanding execution of the following steps when it is executed by the data processing system associated with the first device (10):

sending an authentication request to the second device (1);

receiving a challenge value (c') from the second device (1) after sending the authentication request;

applying a non-secret predefined transformation (g) to the received challenge value to obtain a transformed value (r);

sending the obtained transformed value (r) to the second device; and receiving, after sending the obtained transformed value (r), an identifier from the second device (1) in response to the sent authentication request, the identifier being received after the second device (1) has performed a verification based on the obtained transformed value (r)

to determine whether the first device (10) is in a transmission field of the second device (1).

11. A non-transitory computer-readable medium storing a computer program which executes on a processor of a data processing system associated with a second device (1), for performing authentication in which there is pre-authentication of a first device by the second (1) device communicating with the first device via a wireless connection to determine whether an authentication of the second device (1) by the first device is to be completed, the computer program comprising instructions for commanding execution of the following steps when it is executed by the data processing system associated with the second device (1):

receiving an authentication request from the first device;
verifying, in response to the authentication request, whether the first device is in a transmission field of the second device (1), wherein the verifying step comprises:
sending a challenge value (c);
computing a second transformed value (r") by applying a non-secret predefined transformation (g) to the sent challenge value (c);
receiving a first transformed value (r') after sending the challenge value;
comparing the received first transformed value (r') to the computed second transformed value (r"); and
considering the verifying to have succeeded only if the difference between the computed second transformed value (r") and the received first transformed value (r') is below a predefined threshold (m)
wherein the second device (1) proceeds with authentication in response to the authentication request from the first device only if the verifying by the second device has succeeded.

12. A system, comprising a first device (10) and a second device (1) connected to each other by a wireless connection, for authentication in which there is pre-authentication of the first device (10) by the second device (1) to determine whether an authentication of the second device (1) by the first device (10) is to be completed, wherein the second device (1) includes means for:

receiving an authentication request from the first device (10);
verifying, in response to the authentication request, whether the first device (10) is in a transmission field of the second device (1), wherein the verifying comprises:
sending a first challenge value (c) to the first device (10);
computing a first transformed value (r") by applying a non-secret predefined transformation (g) to the sent first challenge value (c);
receiving a third transformed value (r'), corresponding to a second transformed value (r) sent by the first device (10), after sending the first challenge value (c);
comparing the received third transformed value (r') to the computed first transformed value (r"); and
considering the verifying by the second device to have succeeded only if the difference between the computed first transformed value (r") and the received third transformed value (r') is below a predefined threshold (m),
wherein the second device (1) proceeds with authentication in response to the authentication request from the first device (10) only if the verifying by the second device has succeeded, and
wherein the first device (10) includes means for:
receiving a second challenge value (c') corresponding to the first challenge value (c) sent by the second device (1);
applying the predefined transformation (g) to the received second challenge value (c') to obtain the second transformed value (r); and
sending the obtained second transformed value (r) to the second device (1).

13. The method according to claim 1, wherein each challenge value (c) sent by the second device (1) is a different value from previously-sent challenge values.

* * * * *